US010744608B2

(12) United States Patent
Haschka et al.

(10) Patent No.: US 10,744,608 B2
(45) Date of Patent: Aug. 18, 2020

(54) DAMPING OF VIBRATIONS OF A MACHINE

(71) Applicant: Siemens Aktiengesellschaft, Munich (DE)

(72) Inventors: Markus Stephan Haschka, Karlsruhe (DE); Elmar Schaefers, Fuerth (DE); Torsten Schuer, Erlangen (DE); Dietmar Stoiber, Fuerth (DE)

(73) Assignee: Siemen Aktiengesellschaft, Munich (DE)

( * ) Notice: Subject to any disclaimer, the term of this patent is extended or adjusted under 35 U.S.C. 154(b) by 65 days.

(21) Appl. No.: 16/077,792

(22) PCT Filed: Feb. 16, 2017

(86) PCT No.: PCT/EP2017/053472
§ 371 (c)(1),
(2) Date: Aug. 14, 2018

(87) PCT Pub. No.: WO2017/140760
PCT Pub. Date: Aug. 24, 2017

(65) Prior Publication Data
US 2019/0047103 A1 Feb. 14, 2019

(30) Foreign Application Priority Data
Feb. 16, 2016 (EP) .................................. 16155902

(51) Int. Cl.
| B23Q 11/00 | (2006.01) |
| F16F 7/10 | (2006.01) |
| F16F 7/116 | (2006.01) |
| F16F 1/26 | (2006.01) |
| F16F 15/02 | (2006.01) |

(52) U.S. Cl.
CPC ............ B23Q 11/0035 (2013.01); F16F 1/26 (2013.01); F16F 7/1011 (2013.01); F16F 7/116 (2013.01);
(Continued)

(58) Field of Classification Search
CPC .......... F16F 15/02; F16F 7/116; F16F 7/1011; F16F 1/26; F16F 2238/04; F16F 2222/08; B32Q 11/0035
(Continued)

(56) References Cited

U.S. PATENT DOCUMENTS 4,244,629 A * 1/1981 Habermann ............ F16F 15/03
310/90.5
4,710,656 A * 12/1987 Studer ..................... F16F 15/03
188/267

(Continued)

FOREIGN PATENT DOCUMENTS

| CN | 1042974 | 6/1990 |
| CN | 101316679 | 12/2008 |

(Continued)

OTHER PUBLICATIONS

PCT International Search Report and Written Opinion of International Searching Authority dated Nov. 5, 2017 corresponding to PCT International Application No. PCT/EP2017/053472 filed Feb. 16, 2017.

(Continued)

Primary Examiner — Robert A. Siconolfi
Assistant Examiner — San M Aung
(74) Attorney, Agent, or Firm — Cozen O'Connor

(57) ABSTRACT

A device for damping vibrations of a machine, in particular for damping vibrations of a machine tool, wherein the device includes a first linear motor primary part, a pendulum mass, mounted via at least one supporting sheet-metal assembly provide a relative motion of the pendulum mass along the first linear motor primary part, a first linear motor secondary part fastened to the pendulum mass such that the pendulum mass is actuated via the first linear motor primary part to dampen vibrations of the machine, a second linear motor (Continued)

primary part, and a second linear motor secondary part fastened to the pendulum mass such that the pendulum mass is additionally actuated via the second linear motor primary part to dampen vibrations of the machine so as to achieve an especially compact device that makes it possible to dampen vibrations of machines, in particular machine tools, effectively and without maintenance.

16 Claims, 4 Drawing Sheets

(52) U.S. Cl.
CPC .......... *F16F 15/02* (2013.01); *F16F 2222/08* (2013.01); *F16F 2238/04* (2013.01)
(58) Field of Classification Search
USPC .................. 188/379; 310/51; 267/140.14
See application file for complete search history.

(56) References Cited

U.S. PATENT DOCUMENTS

| | | | |
|---|---|---|---|
| 4,976,415 A * | 12/1990 | Murai | B23Q 11/0032 188/378 |
| 5,248,133 A * | 9/1993 | Okamoto | F16F 15/10 188/161 |
| 2006/0061021 A1 | 3/2006 | Dittmar | |
| 2007/0243033 A1 | 10/2007 | Hashimoto et al. | |
| 2010/0247261 A1 | 9/2010 | Hamann et al. | |
| 2011/0127400 A1* | 6/2011 | Kastelijn | F16F 15/02 248/550 |
| 2015/0219176 A1 | 8/2015 | Choy et al. | |

FOREIGN PATENT DOCUMENTS

| | | |
|---|---|---|
| CN | 101623835 | 1/2010 |
| CN | 102777535 | 11/2012 |
| CN | 104264854 | 1/2015 |
| DE | 579637 | 6/1933 |
| EP | 2174748 | 4/2010 |
| GB | 373827 | 6/1932 |
| GB | 2320547 | 6/1998 |
| JP | H0658368 | 3/1994 |
| JP | 2002061703 | 2/2002 |
| JP | 2011033089 | 2/2011 |

OTHER PUBLICATIONS

Office Action dated Sep. 4, 2019 issued in Chinese Patent Application No. 201780008212.6.

* cited by examiner

DAMPING OF VIBRATIONS OF A MACHINE

CROSS-REFERENCE TO RELATED APPLICATIONS

This is a U.S. national stage of application No. PCT/EP2017/053472 filed Feb. 16, 2017. Priority is claimed on EP Application No. 16155902 filed Feb. 16, 2016, the content of which is incorporated herein by reference in its entirety.

BACKGROUND OF THE INVENTION

1. Field of the Invention

The invention relates to a device for damping vibrations of a machine and to a machine tool, where the device can be used in manufacturing processes that generate vibrations, e.g., in metal-cutting processes. Use in drive machines that generate vibrations, such as electric motors, is likewise conceivable. A machine tool with an inventive device can be used in many manufacturing processes, in particular in metal-cutting manufacturing processes. Vibrations triggered by the operation of the machine or the machine tool are unwanted and lead to a reduced productivity. These unwanted vibrations include what is known as rattling.

2. Description of the Related Art

EP 2 174 748 A1 discloses a conventional machine tool that has a machine element, which is able to be moved via a first motor in a direction of movement via a gear, where the machine tool has a second motor by which a force is able to be exerted on the machine element in the direction of movement of the machine element. In this case, the second motor exerts the force directly on the machine element, without a gear connected between the second motor and the machine element, where the second motor can be controlled so that the force exerted by it counteracts the vibration movements running in the direction of movement of the machine element.

SUMMARY OF THE INVENTION

It is an object of the invention to provide an especially compact device, which makes possible an effective and maintenance-free vibration damping of machines, in particular of machine tools. It is furthermore an object of the invention to provide a machine tool, which is advantageously damped via the device in accordance with the invention.

These and other objects and advantages are achieved in accordance with the invention by a device and a machine tool, where the device has a first linear motor primary part, a pendulum mass, which is mounted via at least one supporting sheet metal assembly such that a relative movement of the pendulum mass along the first linear motor primary part is able to be executed, a first linear motor secondary part, which is fastened to the pendulum mass such that the pendulum mass is able to be actuated via the first linear motor primary part to damp vibrations of the machine, a second linear motor primary part and a second linear motor secondary part, which is fastened to the pendulum mass such that the pendulum mass is additionally able to be actuated via the second linear motor primary part to damp vibrations of the machine. The linear motor primary parts in this case are the active part of the linear motor, which is supplied electrically with energy. This thus involves a stator, if a conventional electric motor is used as a comparison.

A machine in this case can be a large material-cutting machine tool with a large cantilever length. The part of the machine or machine tool to be damped in this case can be referred to as the machine element and can furthermore be formed as a machine table or further part of a machine.

The linear motor secondary parts are passive and do not have to be supplied with electrical energy. They can be constructed as permanent magnets, for example, or can be permanently excited. The pendulum mass is intended for damping and/or accommodating the vibrations that arise through the operation of the machine or machine tool. A supporting sheet metal assembly has at least one supporting sheet, which is supported by two supports, for example. In this way, the pendulum mass can be movably mounted such that the supporting sheet metal assembly is maintenance-free and a sufficiently high mobility and dynamic of the pendulum mass is insured. The linear motor is now controlled such that, through corresponding damping movements, the linear motor actively counteracts the vibrations that are unwanted and to be damped. Compared to conventional active damper systems with conventional supports, such as hydrostatic supports, this has the great advantage that the same damping power is achieved with a significant saving in installation space required and in this system the suspension of the pendulum mass is maintenance-free.

The use and optimized arrangement of two linear motors makes it possible, by comparison with a single linear motor, to obtain more effective force from the same installation space to damp vibrations. This makes the arrangement, which is to apply a specific minimum damping force, far more compact. A combination with at least one supporting sheet metal assembly thus makes a compact and simultaneously maintenance-free device for the first time. The supporting sheets are preferably formed as metal sheets, but can also be manufactured for other materials.

In a further especially advantageous embodiment the device has a position detection system, which is configured to detect a relative position of at least one linear motor secondary part in relation to the respective linear motor primary part. The position detection system makes possible in this embodiment a precise closed-loop control and in this way improves the performance of the device.

In a further advantageous embodiment, the position detection system is configured such that it evaluates the magnetization of at least one of the linear motor secondary parts for position detection. In this way, a measuring element can be saved and the device will be further optimized in relation to the installation space.

In a further embodiment, a first air gap between the first linear motor primary part and the first linear motor secondary part differs from a second air gap between the second linear motor primary part and the second linear motor secondary part. If one now considers the forces of attraction in the air gaps of the two linear motors, then it is especially advantageous to select the air gap of the second linear motor as different to the air gap of the first linear motor. Likewise, it is conceivable that the linear motors have different dimensions. The decisive factor is the force of attraction arising between the linear motor parts, which should be chosen such that the pendulum mass always experiences a difference force of attraction of the two linear motors and these cancel each other out. This means that it is possible to exert a sufficient force in the necessary direction on the pendulum mass and thus on the support arrangements to achieve a high mechanical stability of the pendulum mass while retaining the compact dimensions.

In a further embodiment, the first air gap differs from the second air gap such that a force of attraction always acts against the supporting sheet metal assembly. If a force of attraction acts against the supporting sheet metal assembly, then the stability of the supporting sheet metal assembly increases and makes possible an optimized wear-free and especially compact operation of the device.

In a further embodiment, the pendulum mass is arranged between the linear motor primary parts. This arrangement advantageously enables a number of forms of vibration to be overlaid and the degrees of freedom of the damping to be greatly increased. It is conceivable that the linear motors have dimensions that differ from one another. The advantage that is produced by different air gaps or dimensions is that in this way the pendulum mass still experiences a difference force of attraction of the two linear motors and these do not cancel each other out. This means that it is possible to exert a sufficient force in the necessary direction on the pendulum mass and thus on the support arrangements to achieve an increased mechanical stability of the arrangement. In this way, the device is especially compact with maximum performance.

In a further embodiment, the device also has a controller, which activates at least one of the linear motors such that the pendulum mass counteracts the vibrations of the machine. Such a controller can be integrated into the device, for example, or can form part of a superordinate closed-loop control system that already exists for a machine tool or other machine. The use of usual linear motors enables existing closed-loop control facilities to continue to be used without any problem.

In an especially advantageous embodiment, the device has at least one end position buffer. These types of end position buffers have the great advantage that the device can be formed even more compact, because a collision of the pendulum mass with a casing or with other components can be prevented by the end position buffer and a dimensioning of the device can be reduced accordingly. The end position buffer can be constructed in such cases from different plastics or from rubber, but mechanical dampers and/or spring arrangements are also conceivable.

In a further embodiment, the device has a guide facility, which is formed such that it prevents any contact between the linear motor parts. Such a guide facility can be formed, for example, as a groove in the pendulum mass in combination with corresponding groove tongues. The groove tongues could be fastened to the device, for example, and guide the pendulum mass accordingly such that the linear motor parts are prevented from touching one another and/or touching the pendulum mass. The guide facility makes it possible to reduce the air gaps further and to configure the device to be even more compact.

In a further embodiment, the device has a casing, where at least some of the linear motor parts and also the pendulum mass are arranged inside the casing. It is likewise conceivable for the entire device to be installed in the casing and thus be able to be manufactured and installed separately from the machine or the machine tool. The casing makes possible an isolation of the device from the environment, which safeguards it from external influences and against human actions and furthermore makes it possible to provide this type of device with the option of retrofitting it to already existing systems.

In a further embodiment, the maximum dimension of the device amounts to at most $1/10^{th}$ of the maximum dimension of the machine, especially of the machine tool. The device is able to be formed especially compact. Consequently, it is possible for the maximum dimension of the device to amount to at most $1/10^{th}$ or 10% of the maximum dimension of the machine. This illustrates how compactly a device of this type is able to be created. The maximum dimension in this case can be the length or the width of a machine, for example, depending on the dimension in which vibrations are to be damped. It is further conceivable for the maximum dimension of the device to amount to at least 20 cm, but at most 80 cm. A device of this type can thus have a maximum dimension of 60 cm, for example, which by comparison with the usual machine can be just a fraction.

It is also an object of the invention to provide a machine tool having at least one tool as well as an inventive device for damping vibrations.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described and explained in greater detail below with reference to the exemplary embodiments shown in the figures, in which.

DETAILED DESCRIPTION OF THE EXEMPLARY EMBODIMENTS

Figure 1:
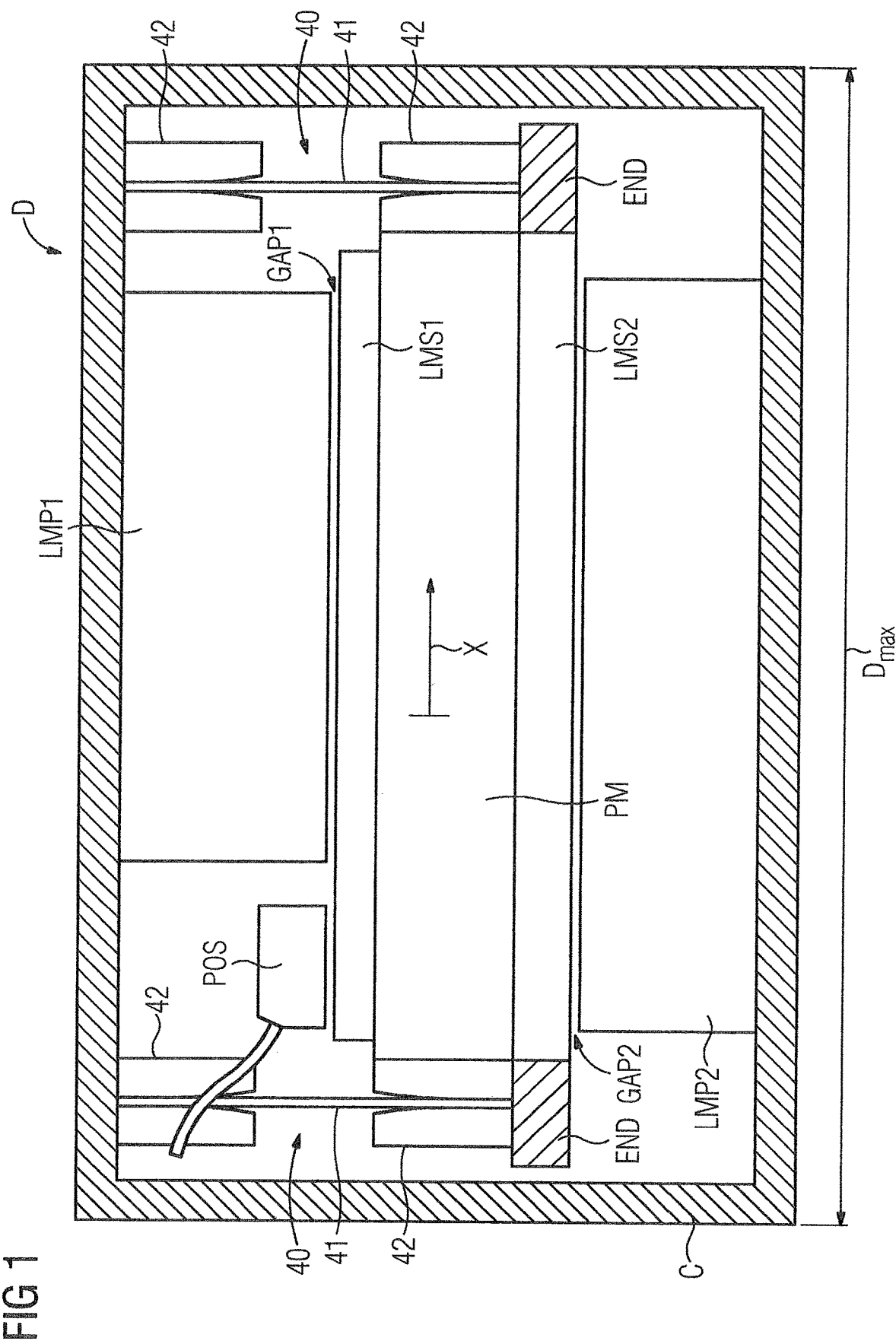
FIG. 1 shows a device for damping of vibrations of a machine in accordance with the invention.

FIG. 1 shows a compact device D for damping vibrations of a machine 1, in particular for damping vibrations of a machine tool. To this end, the device D has a first linear motor LMP1, LMS1, with a first linear motor primary part LMP1 and a first linear motor secondary part LMS1 as well as a second linear motor LMP2, LMS2 with a second linear motor primary part LMP2 and a second linear motor secondary part LMS2. The two linear motor secondary parts LMS1, LMS2 are connected in the device to a pendulum mass PM, which can perform a relative movement in relation to the linear motor primary parts LMP1, LMP2. The linear motor secondary parts LMS1, LMS2 are able to be integrated into the pendulum mass PM. The linear motor secondary parts LMS1, LMS2 in this case are formed in this embodiment as arrangements of permanent magnets, for example.

This makes possible the use of a position detection system POS, which directly evaluates the magnetization of the first linear motor secondary part LMS1 and establishes from this the relative position X of the linear motor secondary part LMS1 or of the pendulum mass PM in relation to the linear motor primary part LMP1. Both linear motor secondary parts LMS1, LMS2 are fastened to the pendulum mass PM.

As a result, only a position detection system POS can be used for the relative positions X of the two linear motors. In this case, the pendulum mass PM is supported for the most compact and maintenance-free possible support via supporting sheet metal assemblies 40. Here, the supporting sheet metal assemblies 40 have supports 42 and also metal pendulum sheets 41, which are clamped into the support 42. For reasons of stability it is very advantageous to provide at least one linear motor LMP1, LMS1, LMP2, LMS2 for the use of supporting sheet metal assemblies 40, which exerts a force against the supporting sheet metal assemblies 40, because the supporting sheet metal assemblies 40 are preferably configured to accommodate tension forces. With a single linear motor LMP1, LMS1, LMP2, LMS2, the space between the two supporting sheet metal assemblies 40 would remain unused. It is thus advantageous to fill this volume with a further linear motor LMP1, LMS1, LMP2, LMS2. The further advantage is also produced that the upper linear motor exerts a force against the lower linear motor on the pendulum mass PM and partly balances out the tensile force of the linear motor again. The pendulum frequency of the device D is essentially produced from the length of the supporting sheet metal assemblies 40 and the resulting tension force. For the application as vibration damper it is advantageous for the pendulum frequency to lie as low as possible. The upper linear motor LMP1, LMS1 reduces the inherent frequency of the pendulum or of the pendulum mass PM, because it partly compensates for the tensile force of the lower linear motor LMP2, LMS2. A complete compensation for the force of attraction of the two linear motors LMP1, LMS1, LMP2, LMS2 is unwanted, because this could give rise to an unwanted state of uncertainty. The gravitational force is to be taken into account during this dimensioning, but is rather small when compared to the forces of attraction of the linear motors LMP1, LMS1, LMP2, LMS2. The device D can be used at any angle of inclination and even rotated by 180 degrees. The linear motors LMP1, LMS1, LMP2, LMS2 are in a position to compensate for the gravitational force which would move the pendulum mass PM out of the linear motors LMP1, LMS1, LMP2, LMS2. This could be parameterized accordingly in a control device.

In order to enable the device D to be used in the most flexible manner possible and to be protected from outside influences, the device has a casing C. This makes possible a separate and independent positioning of the device D on a machine 1. It is however also conceivable for the machine 1 to have a corresponding device D without the device needing a casing C. For example, a recess can already be provided in the machine 1 for the device D. Here, the device D has a maximum dimension $D_{max}$. In this case, the maximum dimension $D_{max}$ is the dimension that extends in the direction of the relative position X.

In order to make the compact arrangement depicted in FIG. 1 even more compact, it is possible to provide the pendulum mass PM with end position buffers END. These end position buffers END prevent a hard impact of the pendulum mass PM on the casing C or on the machine 1, such as when the supply voltage fails or when another error is present.

The arrangement shown in FIG. 1 is shown schematically and, for the sake of clarity, has not been made as compact as if it were a real device. Here, the linear motors LMP1, LMS1, LMP2, LMS2 could entirely fill the space available for them and at least one of the linear motors LMP1, LMS1, LMP2, LMS2 could extend completely along the maximum dimension $D_{max}$ within the casing C, here. Even without a casing C it is desirable to fill out the installation space as completely as possible.

Figure 2:
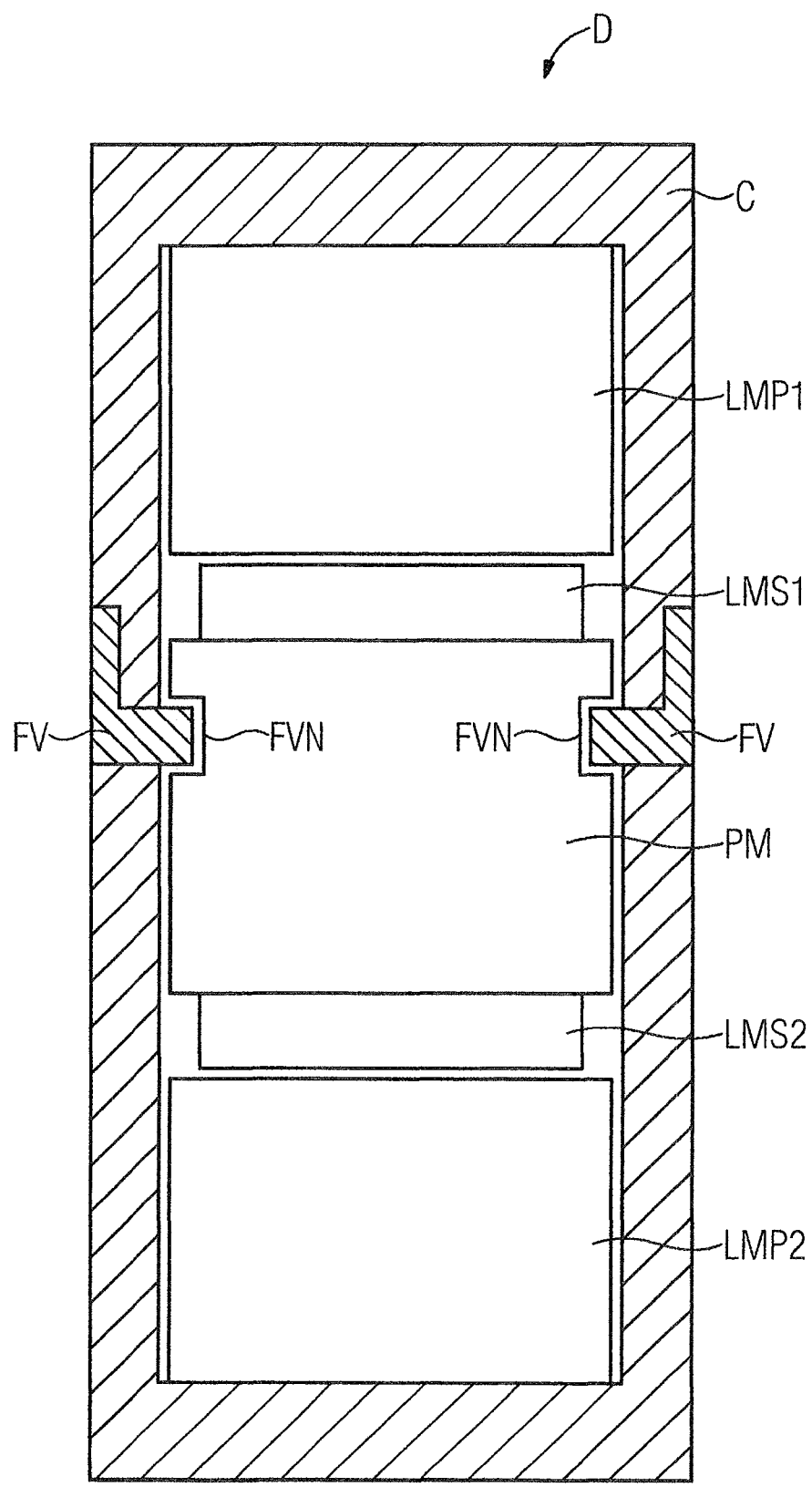
FIG. 2 shows a device in cross-section in accordance with the invention.

FIG. 2 shows a cross-section through a device D in a casing C and uses the reference characters from FIG. 1. A guide facility FV, FVN is to be seen in this figure, which in this case is formed as two groove tongues FV, which each engage in a groove FVN of the pendulum mass PM. The guide facility FV, FVN in this case is formed overall such that a tilt over of the pendulum mass PM is prevented such that the linear motor secondary parts LMS1, LMS2 come into contact with the linear motor primary parts LMP1, LMP2. Because of the strong forces of attraction between the linear motor primary and linear motor secondary parts LMP1, LMS1, LMP2, LMS2 the tilt over would be an undesired effect and is effectively prevented by the guide facility FV.

Figure 3:
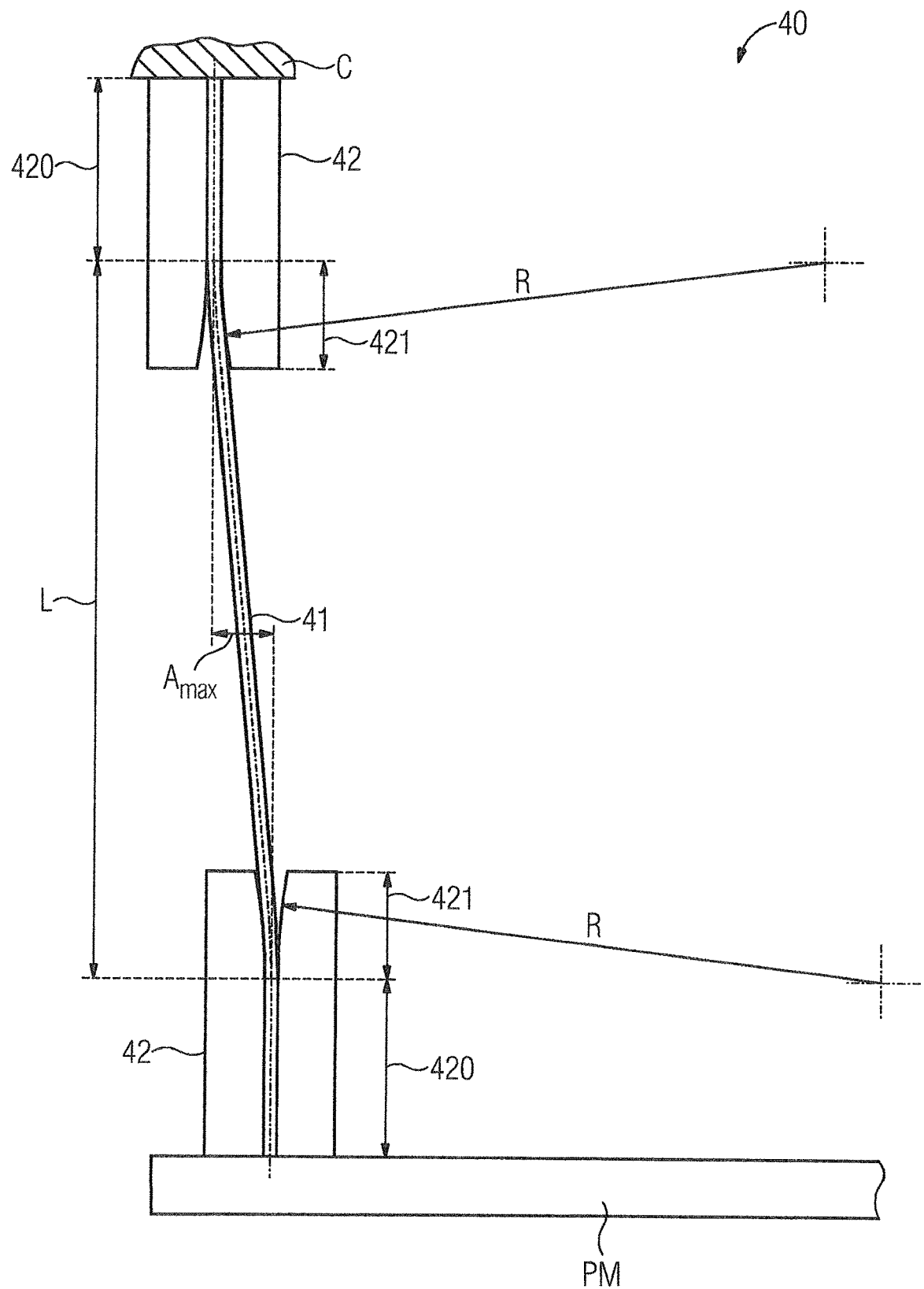
FIG. 3 shows a supporting sheet metal assembly in detail in accordance with the invention.

FIG. 3 shows a supporting sheet metal assembly 40 in detail. The corresponding reference characters are used in a similar way to FIG. 1. The pendulum mass PM is fastened to the lower support 42, which is connected by a metal supporting sheet 41 to a support 42 fastened above it. Here, the upper support 42 can be fastened directly to a casing C, can be formed as a part of the casing C and/or can be fastened directly to a machine 1. Furthermore, the lower of the two supports 42 is deflected by a deflection $A_{max}$. This deflection $A_{max}$ should represent the maximum deflection that occurs during operation of the pendulum mass PM. It can further be seen that the supports 42 each have a clamping area 420 and also a bending motion link 421. In this case, the clamping area 420 is to be understood as the area in which the metal supporting sheet 41 is fastened. This can not only be done by clamping, e.g., via bolts or screws, but also by further conventional fastening measures or combinations thereof. The bending motion link 421 is the area of the support 42, in which the metal supporting sheet 41 can bend furthest without plastic deformation and thus the movement of the pendulum mass PM is only made possible at all therewith. Also shown is the free length L, which represents the actual vibrating length and thus has an influence on the inherent frequency of the arrangement. The radii R shown are intended to show the curvature of the bending motion links 421. This curvature enables it to be controlled by the construction of the support 42 that the metal supporting sheet 41 does not deform outside the predeterminable requirements. These predeterminable requirements can involve maximum bending strains, for example, which can arise from the bending radius. It is desirable in particular that the strains that occur in the metal supporting sheet 41, remain below the fatigue strength strain of the metal supporting sheet 41.

Figure 4:
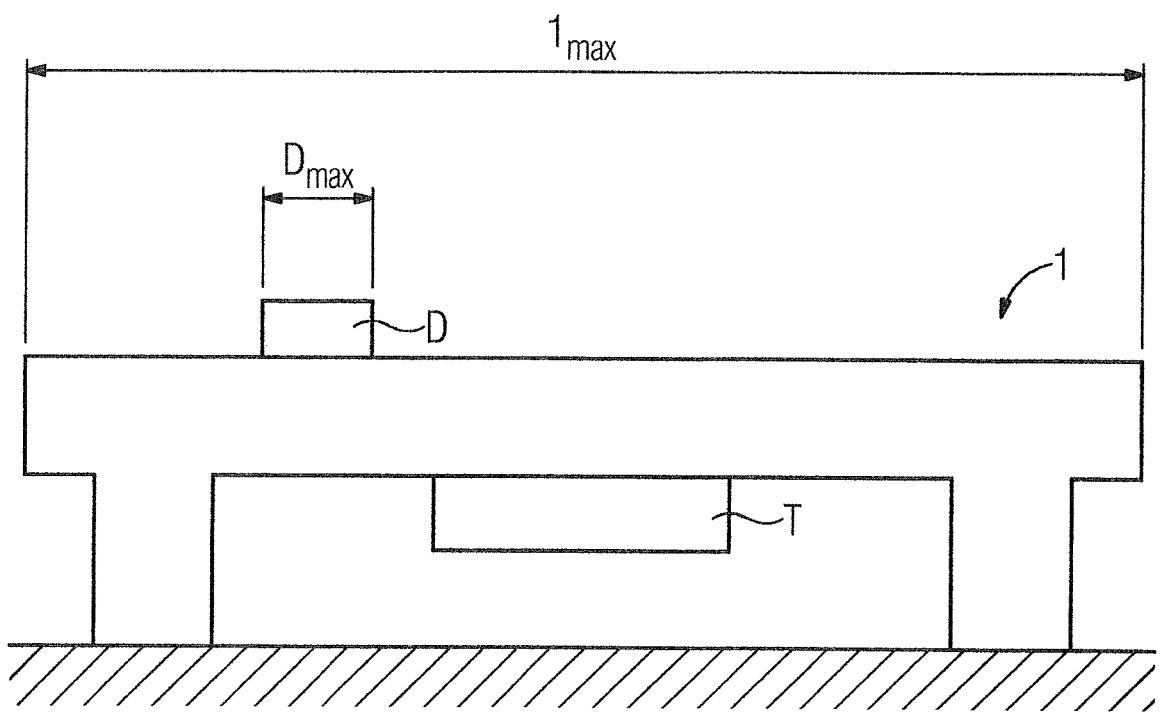
FIG. 4 shows a machine, in particular a machine tool, having a device for damping of vibrations of the machine in accordance with the invention.

FIG. 4 shows a machine 1, in this case, for example, a machine tool with a tool T, which generates vibrations in the portal arrangement of the machine 1, for example. Also to be seen is the device D, which damps these unwanted vibrations. The device D in this figure has a maximum dimension $D_{max}$ and the machine 1 in this figure has a maximum dimension $1_{max}$. Here, it is conceivable that the device D only has a fraction of the maximum dimension $1_{max}$ of the machine 1. As a result of the inventive combination of features, this makes possible an especially compact and yet despite this maintenance-free structure of the device D for damping of vibrations of the machine 1.

In summary, the disclosed embodiments of the invention relate to a machine tool and a device D for damping of vibrations of a machine 1, in particular for damping of vibrations of a machine tool. In order to achieve an especially compact device D, which makes possible an effective and maintenance-free vibration damping of machines, in particular of machine tools, a device is provided that has a first linear motor primary part LMP1, a pendulum mass PM, which is supported via at least one supporting sheet metal assembly 40 in such a way that a relative movement of the pendulum mass PM along the first linear motor primary part LMP1 is able to be performed, a first linear motor secondary part LMS1, which is fastened to the pendulum mass PM such that the pendulum mass is able to be actuated via the first linear motor primary part LMP1 to damp vibrations of the machine, a second linear motor primary part LMP2 and a second linear motor secondary part LMS2, which is fastened to the pendulum mass PM such that the pendulum mass PM is able to be actuated additionally via the second linear motor primary part LMP1 to damp vibrations of the machine 1.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for damping of vibrations of a machine, comprising:
   a first linear motor primary part;
   a pendulum mass mounted via at least one supporting sheet metal assembly such that a relative movement of the pendulum mass along the first linear motor primary part is performable;
   a first linear motor secondary part fastened to the pendulum mass such that the pendulum mass is actuatable via the first linear motor primary part to damp vibrations of the machine;
   a second linear motor primary part; and
   a second linear motor secondary part fastened to the pendulum mass such that the pendulum mass is additionally is actuatable via the second linear motor primary part to dampen vibrations of the machine;
   wherein the pendulum mass is arranged between the linear motor primary parts.

2. The device as claimed in claim 1, further comprising:
   a position detection system which detects a relative position of at least one linear motor secondary part in relation to a respective linear motor primary part.

3. The device as claimed in claim 2, wherein the position detection system evaluates a magnetization of at least one of the linear motor secondary parts for position detection.

4. The device as claimed in claim 1, wherein a first air gap between the first linear motor primary part and the first linear motor secondary part differs from a second air gap between the second linear motor primary part and the second linear motor secondary part.

5. The device as claimed in claim 2, wherein a first air gap between the first linear motor primary part and the first linear motor secondary part differs from a second air gap between the second linear motor primary part and the second linear motor secondary part.

6. The device as claimed in claim 3, wherein a first air gap between the first linear motor primary part and the first linear motor secondary part differs from a second air gap between the second linear motor primary part and the second linear motor secondary part.

7. The device as claimed in claim 4, wherein the first air gap differs from the second air gap such that a force of attraction always acts against the supporting sheet metal assembly.

8. The device as claimed in claim 1, further comprising:
   a controller which actuates at least one of the linear motors such that the pendulum mass counteracts vibrations of the machine.

9. The device as claimed in claim 1, further comprising:
   at least one end position buffer.

10. The device as claimed in claim 1, further comprising:
    a guide facility configured to prevent contact between the linear motor parts.

11. The device as claimed in claim 1, further comprising:
    a casing;
    wherein at least a part of the linear motor parts and the pendulum mass are arranged within the casing.

12. The device as claimed in claim 1, wherein a maximum dimension of the device amounts to at most $1/10^{th}$ of a maximum dimension of the machine.

13. The device as claimed in claim 12, wherein the maximum dimension of the device is between arrange of at least 20 cm and not more than 80 cm.

14. The device as claimed in claim 12, wherein the maximum dimension of the device amounts to at most $1/10^{th}$ of a maximum dimension of a machine tool.

15. A machine tool having at least one tool and also the device for damping vibrations as claimed in claim 1.

16. The device as claimed in claim 1, wherein the device dampens vibrations of a machine tool.

* * * * *